US009215247B2

(12) United States Patent
Chess et al.

(10) Patent No.: US 9,215,247 B2
(45) Date of Patent: Dec. 15, 2015

(54) APPLICATION SECURITY TESTING

(75) Inventors: Brian V. Chess, Palo Alto, CA (US);
Iftach Ragoler, Alpharetta, GA (US);
Philip Edward Hamer, Alpharetta, GA (US);
Russell Andrew Spitler, San Francisco, CA (US); Sean Patrick Fay, San Francisco, CA (US); Prajakta Subbash Jagdate, Alpharetta, GA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/116,000

(22) PCT Filed: May 31, 2011

(86) PCT No.: PCT/US2011/038609
§ 371 (c)(1),
(2), (4) Date: Nov. 6, 2013

(87) PCT Pub. No.: WO2012/166120
PCT Pub. Date: Dec. 6, 2012

(65) Prior Publication Data
US 2014/0082739 A1    Mar. 20, 2014

(51) Int. Cl.
*H04L 29/06* (2006.01)
*G06F 21/57* (2013.01)
*G06F 11/07* (2006.01)

(52) U.S. Cl.
CPC ........ *H04L 63/1433* (2013.01); *G06F 11/0727* (2013.01); *G06F 11/0793* (2013.01); *G06F 21/577* (2013.01)

(58) Field of Classification Search
CPC . H04L 63/1433; H04L 63/1416; H04L 63/20; G06F 21/577; G06F 21/50
USPC .......................................................... 726/25
See application file for complete search history.

(56) References Cited

U.S. PATENT DOCUMENTS 6,311,278 B1    10/2001    Raanan et al.
6,584,569 B2     6/2003    Reshef et al.
(Continued)

FOREIGN PATENT DOCUMENTS

CN       1610887      4/2005
JP      2007241906    9/2007
(Continued)

OTHER PUBLICATIONS

Chess B. et al. "Static Analysis for Security" IEEE Security and Privacy< IEEE Computer Society, NE York, NY, US, vol. 2, No. 6, Nov. 1, 2004, p. 76-79.*
(Continued)

*Primary Examiner* — Yonas Bayou
(74) *Attorney, Agent, or Firm* — Hewlett Packard Enterprise Patent Department

(57) ABSTRACT

The present disclosure provides a system that includes a server hosting an application under test (AUT), an observer configured to monitor instructions executed by the AUT, and a computing device communicatively coupled to the AUT and the observer through a common communication channel. The computing device may be configured to send an application request to the AUT, wherein the application request is configured to expose a potential vulnerability of the AUT. The computing device may receive an application response from the AUT in accordance with the AUT's programming. The computing device may send a service request to the observer, and receive a service response from the observer that contains information corresponding to the instructions executed by the AUT due to the application request, information about the AUT, or information about a server hosting the AUT.

20 Claims, 4 Drawing Sheets

(56) References Cited

U.S. PATENT DOCUMENTS

| | | | |
|---|---|---|---|
| 6,826,716 | B2 | 11/2004 | Mason |
| 6,996,845 | B1 | 2/2006 | Hurst |
| 7,000,247 | B2 | 2/2006 | Banzhof |
| 7,200,867 | B2 | 4/2007 | Hurst et al. |
| 7,237,265 | B2 * | 6/2007 | Reshef et al. .................. 726/25 |
| 7,765,597 | B2 | 7/2010 | Sima et al. |
| 7,818,788 | B2 | 10/2010 | Meier |
| 8,087,088 | B1 | 12/2011 | Pennington et al. |
| 8,566,945 | B2 * | 10/2013 | Sima .............................. 726/25 |
| 8,601,586 | B1 * | 12/2013 | Boutros et al. ................. 726/25 |
| 8,627,479 | B2 * | 1/2014 | Wittenstein et al. ............ 726/25 |
| 8,656,495 | B2 * | 2/2014 | Sima et al. ..................... 726/25 |
| 8,789,187 | B1 * | 7/2014 | Pennington et al. ............ 726/25 |
| 8,893,282 | B2 * | 11/2014 | Pennington et al. ............ 726/25 |
| 2002/0010855 | A1 | 1/2002 | Reshef |
| 2005/0044420 | A1 | 2/2005 | Raanan |
| 2005/0273854 | A1 * | 12/2005 | Chess et al. ..................... 726/22 |
| 2005/0273859 | A1 * | 12/2005 | Chess et al. ..................... 726/25 |
| 2005/0273860 | A1 * | 12/2005 | Chess et al. ..................... 726/25 |
| 2005/0273861 | A1 * | 12/2005 | Chess et al. ..................... 726/25 |
| 2007/0101196 | A1 * | 5/2007 | Rogers et al. .................. 714/38 |
| 2007/0156644 | A1 | 7/2007 | Johnson et al. |
| 2007/0186285 | A1 | 8/2007 | Hurst et al. |
| 2008/0263671 | A1 | 10/2008 | Solino et al. |
| 2009/0138589 | A1 | 5/2009 | Wunderlich |
| 2009/0282480 | A1 * | 11/2009 | Lee et al. ........................ 726/22 |
| 2009/0327943 | A1 | 12/2009 | Medvedev et al. |
| 2010/0180193 | A1 | 7/2010 | Jagdale et al. |
| 2011/0099375 | A1 | 4/2011 | Hammes et al. |
| 2011/0173693 | A1 | 7/2011 | Wysopal et al. |

FOREIGN PATENT DOCUMENTS

| | | |
|---|---|---|
| JP | 2008299540 | 12/2008 |
| JP | 2010033543 | 2/2010 |
| JP | 2010157211 | 7/2010 |
| JP | 2010267266 | 11/2010 |

OTHER PUBLICATIONS

McGraw, G. "Software Security" IEEE Security and Privacy, IEEE Computer Society, NY, US, vol. 2, No. 2, Mar. 1, 2004, p. 80-83.*

Acunetix Software, Inc., "Is Your Website Hackable?", Acunetix Ltd., 2010, Available at http://www.acunetix.com/vulnerability-scanner/wvsbrochure.pdf, last accessed on May 31, 2011.

Acunetix "Finding the Right Web Application Scanner; Why Black Box Scanning is Not Enough", Available at http://www.acunetix.com/websitesecurity/finding-the-right-web-application-scanner.pdf, last accessed on May 31, 2011.

International Searching Authority, Appl No. PCT/US2011/038609 filed May 31, 2011, Search Report and Written Opinion dated Feb 9, 2012, 8 pages.

iViZ Security: "Application Penetration Testing", 2009-2013 iViZ Techno Solutions Pvt. Ltd., Available at http://www.ivizsecurity.com/applicalion-penetration.html, (last accessed on Jun. 28, 2011).

Mediawiki OWASP Foundation, Testing for Incubated Vulnerability (OWASP-DV-015), Available at https://www.owasp.org/index.php/Testing_for_Incubated_Vulnerability_(OWASP-DV-015), (last accessed on Jun. 28, 2011).

Newsome, James, et al., "Dynamic Taint Analysis for Automatic Detection, Analysis, and Signature Generation of Exploits on Commodity Software," Proceedings of the 12th Annual Network and Distributed System Security Symposium (NDSS '05), Feb. 2005. Available at http://valgrind.org/docs/newsome2005.pdf, last accessed on May 31, 2011.

Application and Middleware Security, Nov. 23, 2006, Computer Security Laboratory, CIISE, <http://users.encs.concordia.ca/~debbabi/pdf/application_middleware_security.pdf>, Nov. 23, 2006, 31 pages.

Bau, J. et al., State of the art: Automated Black-box Web Application Vulnerability Testing, Security and Privacy (SP), 2010 IEEE Symposium on, IEEE, 2010, pp. 332-345.

Extended European Search Report, Feb. 2, 2015, European Patent Application No. 11866677.5, 9 pages.

Qualys, Web Application Security: How to Minimize the Risk of Attacks, IBM ISS X-Force 2010 Mid-year Trend & Risk Report, <Http://www.qualys.com/docs/qg_was_guide.pdf>, Feb. 2011, 7 pages.

Vinuesa, et al., A Dynamic Aspect Weaver Over the .NET Platform, D.L. Hicks (Ed.): MIS 2003, LCNX 3002, pp. 197-212, 2004, Springer-Verlag Berlin Heidelberg 2004.

* cited by examiner

APPLICATION SECURITY TESTING

BACKGROUND

Software security testing is used to identify vulnerabilities in an application such as a Web application. Traditional black-box security testing for Web-based software works by using a security testing application, often referred to as a scanner, which poses as an attacker. In a black-box approach, the scanner explores an Application Under Test (AUT) by making HTTP requests and evaluating the HTTP responses in order to find all of the URLs where the AUT accepts input. The URLs where the AUT accepts input may be referred to the attack surface of the AUT. The scanner then creates attacks based on the attack surface and likely categories of vulnerabilities. The scanner applies the attacks to diagnose the presence or absence of vulnerabilities by evaluating the program's HTTP responses. In a black-box approach, the scanner does not have any insight into the internal workings of the AUT.

Black-box vulnerability testing is straightforward in concept, but in practice it presents a number of challenges. For example, exploring the AUT might not reveal all of the attack surface, so the scanner might not launch attacks against all of the places where the AUT is vulnerable. Additionally, some vulnerabilities cannot be accurately identified through the information returned in the HTTP response. If the scanner does discover a vulnerability, the scanner cannot provide information about where the vulnerability is inside the code of the AUT. Furthermore, the scanner may report several vulnerabilities that are all related to the same underlying problem in the AUT, causing a programmer trying to fix the vulnerabilities to carry out a great deal of repetitive work.

BRIEF DESCRIPTION OF THE DRAWINGS

Certain embodiments are described in the following detailed description and in reference to the drawings, in which.

DETAILED DESCRIPTION OF SPECIFIC EMBODIMENTS

Embodiments described herein provide techniques for performing gray-box security testing of a Web application. In gray-box security testing, a software program referred to herein as an observer is used to watch the internal operations performed by the AUT. The observer enables the scanner to determine the operation of the AUT and how it behaves in response to attacks. The observer also enables the scanner to determine the behavior of the AUT in response to normal application requests, which the scanner may use to determine what types of attacks to send. The scanner continues to deliver attacks to the AUT, and the scanner receives knowledge of the internal workings of the AUT from the observer. In this way, the scanner can find more vulnerabilities and produce better vulnerability reports, thereby providing a more comprehensive and detailed software security test of web-based applications.

In accordance with embodiments, a communication channel is provided between the observer and the scanner. The scanner uses this communication channel to get insight into the AUT during its scanning. The communication channel between the scanner and the observer may be implemented by using the communication channel already in use by the AUT. In this way, the person conducting the test does not have to perform additional configuration or setup work, and the communication channel does not interfere with the normal operation of the AUT or the computer system on which the AUT is running. Additional benefits of the present invention may be better understood with reference to the description provided below.

Figure 1:
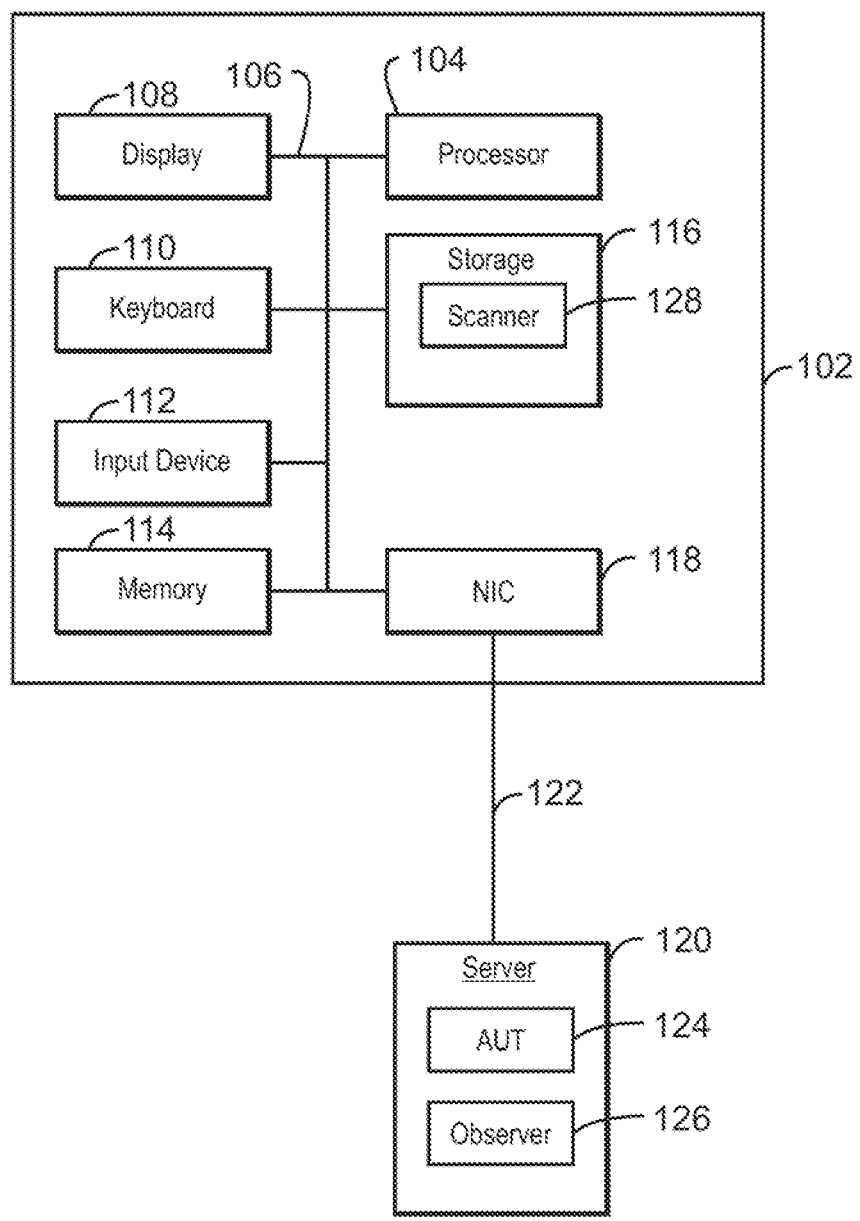
FIG. 1 is a block diagram of a system that may be used to conduct gray-box security testing, in accordance with embodiments.

FIG. 1 is a block diagram of a system that may be used to conduct gray-box security testing, in accordance with embodiments. The system is generally referred to by the reference number 100. Those of ordinary skill in the art will appreciate that the functional blocks and devices shown in FIG. 1 may comprise hardware elements including circuitry, software elements including computer code stored on a non-transitory, machine-readable medium, or a combination of both hardware and software elements. Further, the configuration is not limited to that shown in FIG. 1, as any number of functional blocks and devices may be used in embodiments of the present invention. Those of ordinary skill in the art would readily be able to define specific functional blocks based on design considerations for a particular electronic device.

As illustrated in FIG. 1, the system 100 may include a computing device 102, which will generally include a processor 104 connected through a bus 106 to a display 108, a keyboard 110, and one or more input devices 112, such as a mouse, touch screen, or keyboard. In an embodiment, the computing device 102 is a general-purpose computing device, for example, a desktop computer, laptop computer, server, and the like. The computing device 102 can also have one or more types of non-transitory, computer readable media, such as a memory 114 that may be used during the execution of various operating programs, including operating programs used in embodiments of the present invention. The memory 114 may include read-only memory (ROM), random access memory (RAM), and the like. The device 102 can also include other non-transitory, computer-readable media, such as a storage system 116 for the long-term storage of operating programs and data, including the operating programs and data used in embodiments of the present invention.

In an embodiment, the computing device 102 includes a network interface controller (NIC) 118, for connecting the device 102 to a server 120. The computing device 102 may be communicatively coupled to the server 120 through a network 122, such as the internet, a local area network (LAN), a wide-area network (WAN), or another network configuration. The server 120 may have a non-transitory, computer-readable media, such as storage device, for storing data, buffering communications, and storing operating programs of the server 120. Communications between the device 102 and the server 120 may be conducted using a request-response protocol such as the Hyper-Text Transfer Protocol (HTTP).

The server 120 may be an application server that hosts the AUT 124. The server 120 also includes an observer 126 that monitors the AUT 124 during execution. The computing device 102 may include a scanner 128 that performs a security test against the AUT 124. For example, the scanner 128 may send HTTP requests to the AUT 124 through the network 122, wherein the HTTP request is configured to attempt to expose a vulnerability of the AUT 124. The HTTP requests may include HTTPS requests, which combine the Hypertext Transfer Protocol with the SSL (Secure Sockets Layer) and TLS (Transport Layer Security) protocols to provide encrypted communication and secure identification of a network Web server. During the processing of the HTTP request by the AUT 124, the observer 126 monitors the internal processes performed by the AUT 124. For example, the observer 126 can identify lines of code that are executed by the AUT 124, files that are accessed, database queries that are performed, and the like. Both the observer 126 and the AUT 124 may be configured to communicate with the scanner 128 over a same HTTP channel. As described further in reference to FIG. 2, some requests sent from the scanner 128 to the server 120 may target the AUT 124 to elicit a response from the AUT 124 in accordance with its programming. Other requests sent from the scanner 128 to the server 120 may target the observer 126 to obtain additional information regarding the effect that a particular request had on the operations performed by the AUT 124 or other information related to the AUT 124, the observer 126, or the server 120 hosting the AUT 124. Data received by the scanner 128 in responses to application requests and service requests may be used by the scanner 128 to generate vulnerability reports. Vulnerability reports may be displayed to the user though a user interface provided by the scanner 128.

Figure 2:
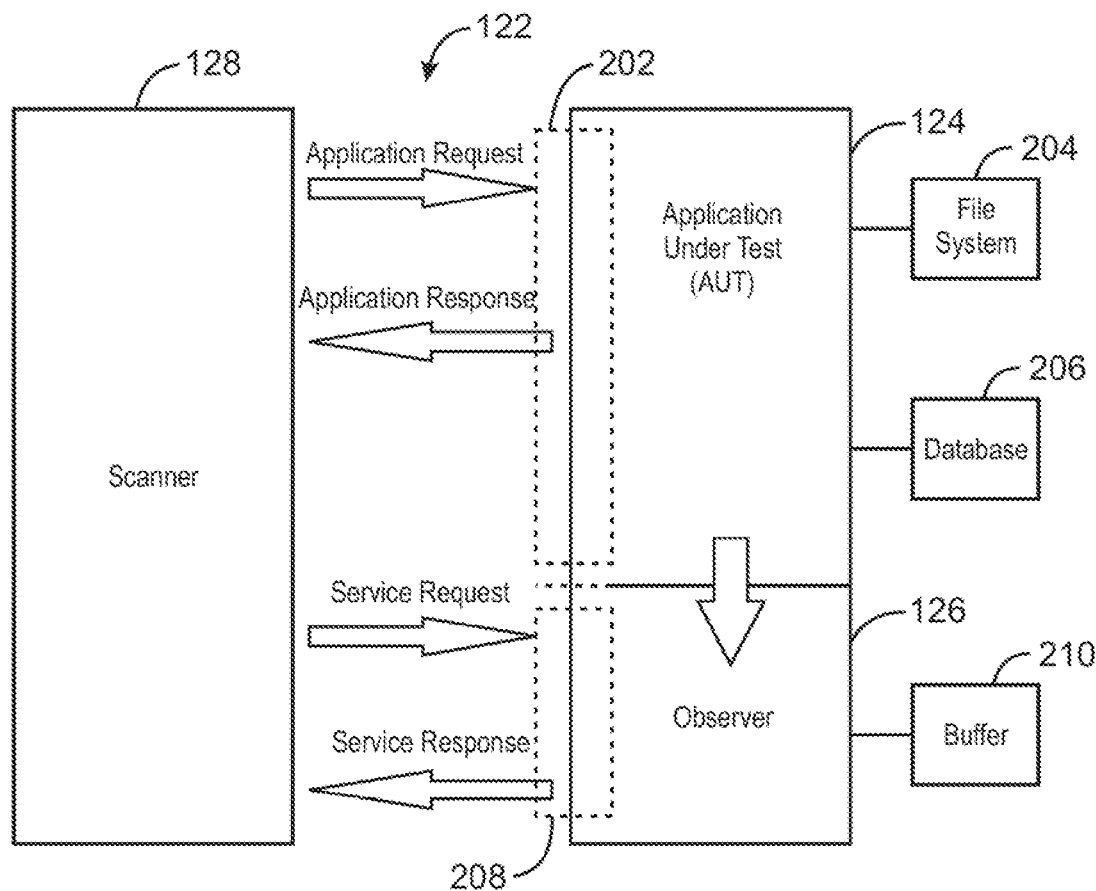
FIG. 2 is a block diagram showing a testing system configuration for conducting gray-box security testing, in accordance with embodiments.

FIG. 2 is a block diagram showing a testing system configuration for conducting gray-box security testing, in accordance with embodiments. The system 200 may include the scanner 128, the AUT 124, and the observer 126. The AUT 124 may be encoded in any suitable Web-based computer language, such as JAVA, or .NET, among others. The AUT 124 may operate within an suitable software framework, such as Struts, Struts 2, ASP.NET MVC, Oracle WebLogic, and Spring MVC, among others. The software framework includes a set of common code modules that provide generic functionality, which can be selectively overridden or specialized by user code to providing specific functionality. The AUT 124 may be configured to execute one or more instances of a Java Virtual Machine (JVM), Common Language Runtime (CLR), other runtime environment for processing requests from the scanner 128. The programming instructions provided by the common code modules of the software framework or runtime environment may be referred to as container code. The custom programming instructions specific to the AUT 124 may be referred to as user code.

The AUT 124 includes a network interface 202 for enabling communications between the scanner 128 and the AUT 124 through the network 122. The network interface 202 exposes the attack surface of the AUT 124 and is the same interface that would eventually be used to provide access to the AUT 124 when the AUT 124 is made available for general use. Communication between the scanner 128 and the AUT 124 over the network interface 202 may be conducted through HTTP requests issued from the scanner 128 to the AUT 124 and HTTP responses issued from the AUT 124 to the scanner 128. Requests targeting the AUT 124 may be referred to as application requests, and responses received from the AUT 124 may be referred to as application responses. The application requests generated by the scanner 128 may be configured to expose potential vulnerabilities of the AUT 124.

The AUT 124 may be coupled to a file system 204, a database 206, and other resources used by the AUT 124. The database 206 may include a variety of user information such as a table of usernames and passwords used to grant access to various resources of the AUT 124, for example. The file system 204 may include data and programs used by the AUT 124, as well data which may be requested by a user such as HTTP pages, software programs, media files, and the like.

The observer 126 operates within the execution environment of the AUT 124 and has access to the internal operations performed by the AUT 124. For example, the observer may modify the bytecode of the AUT 124 by injecting additional code, such as a JAVA class, at various program points. The injected code acts as a monitor that observes the AUT 124. The injected monitor code may be located at strategic program points in the AUT 124, for example, application programming interface (API) calls that perform specific operations such as reading a URL parameter or writing to the file system 204. Whenever such a program point in the AUT 124 is executed, the monitor calls into services provided by the observer 126 to record operations performed by AUT 124. The observer 126 may be coupled to a buffer 210 for storing information that has been collected regarding the internal operations of the AUT 124. The buffer 210 may be used, to store data that has been collected but has not yet been reported to the scanner 128. The buffer 210 may be stored in non-volatile storage medium such as a hard disk, solid state drive, and the like.

The observer 126 may also include an additional network interface 208 for enabling communications between the observer 126 and the scanner 128 through the network 122. As noted above, both network interfaces 202 and 208 may use the same communication channel, for example, the same HTTP channel. Communications between the scanner 128 and the observer 126 may be implemented through the use of custom request and response headers. Custom headers may be added to the application requests by the scanner 128, and custom headers may be added to the application responses by the observer 126. In this way, at least some of the communications between the scanner 128 and the observer 126 may be piggy-backed on normal communications with the AUT 124. Using a single channel of communication eliminates any problems with opening a dedicated, secondary channel, and adding HTTP headers typically does not interfere with the normal operation of the AUT 124.

The scanner 128 may add one or more custom headers to each application request, wherein the custom headers include information that the observer 126 may use to diagnose a vulnerability related to an attack in progress. Information within the custom header can include the version of the scanner 128, or the payload that the scanner 128 is using in the attack. The payload information may be used by the observer 126 to determine whether the attack succeeded.

The scanner 128 may also use custom request headers to generate requests that target the observer 126 to obtain additional information regarding the internal processes performed by the AUT 124, or information about AUT, the server 120 (FIG. 1), or the observer 126. Requests targeting the observer 126 may be referred to as service requests, and responses received from the observer 126 may be referred to as service responses. Service responses issued by the observer 126 may include supplemental information in the body of the service response, as described further below.

In embodiments, the observer 126 is configured to receive the application requests and the service requests sent from the scanner 128 to the AUT 124. The observer 126 may then analyze the header information to determine whether the request is an application request or a service request. Upon receiving an application request, the observer 126 may analyze the header information to acquire data used by the observer 126 regarding the specific, application request. Application requests may then be delivered by the observer 126 to AUT 124 for processing by the AUT 124 according to the AUTs programming. When the AUT 124 generates the application response, the observer 126 may add one or more custom headers to the application response to send additional information back to the scanner 128. The custom headers added to application requests and application responses may be referred to as per-request headers and are further described in the section entitles "Per-request Headers."

Upon receiving a service request, the observer 126 may process the request without delivering the service request to the AUT 124. The service request may include one or more custom headers that include information configured to request a particular service of the observer 126, such as name of the service being requested. The observer 126 may respond with the requested information in the body of an HTTP response, referred to herein as a "service response." In embodiments, the information provided by the observer 126 in the body of the service response may be formatted using Java Script Object Notation (JSON) and may be a self-identifying JSON object. If the observer 126 has no information to send, the response body may be empty. Service requests are further described in the sections entitled "Service Requests-."

Per-Request Headers

The per-request headers may be custom HTTP headers, which may include a custom field name followed by one or more field values that are understood by the observer 126 and the scanner 128. The custom HTTP headers are ignored by the AUT 124. It will be appreciated that the field names described herein are merely used as examples of field names that could be used in a particular implementation and are not intended to limit the scope of the claims.

The per-request headers may include a version header used to coordinate the interaction between the scanner 128 and the observer 126. The observer 126 may add a version header to every application response. The scanner 128 may use the version header to verify that the observer 126 is installed. As an example, the version header may be formatted as follows;

X-WIPP-Version: <language>/<version>/<vm_id>

In the example version header, the prefix "X-WIPP" identifies the header as a custom header that is used by the observer 126. The field name "X-WIPP-VERSION" is a string of characters that uniquely identifies the custom header as a version header. The <language> field value may be the name of a runtime environment used by the AUT 124 to process the application request, such as Java or .NET, among others. In some cases, the AUT 124 may execute two or more processes, which may be handled by different runtime instances. For example, the AUT 124 may use a load balancer or other work distribution arrangement for processing application requests. The scanner 128 may use the <vm_id> field value to identify the process within the AUT 124 handling the application request. For example, the <vm_id> field value may be a name that uniquely identifies the runtime instance that processed the application request, such as a specific JVM instance (in the case of JAVA), CLR instance (in the case of .NET), or other type of runtime instance. The <version> field value may be a number or character string that identifies the version of the observer 126. The scanner 128 may use the identified version of the observer 126 to properly coordinate interactions with the observer 126 in the event that the observer's interface 208 changes between versions of the observer software.

The per-request headers may also include a File-Not-Found (FNF) header used by the scanner 128 to identify a file-not-found condition. In HTTP, if a client requests a resource that doesn't exist or cannot be found, the Web application may generate a standard error code referred to as HTTP code 404. Simple Web applications often indicate the file-not-found condition by returning the HTTP code 404 in the HTTP response. A more complex Web application may "swallow" the 404 code. In other words, rather than simply returning the HTTP code 404 error in the HTTP response, the code 404 may trigger the Web application to redirect the client to an error page, landing page, or any other part of the Web application. In traditional black-box testing, redirecting the scanner 128 to a different part of the Web application rather than simply reporting the error may cause the scanner 128 to incorrectly report a false positive. The FNF header can be used to avoid this result. Because the observer 126 is operating inside the application, the observer 126 can detect the file-not-found error and report the file-not-found error by adding the FNF header to the application response. For example. If the application request provokes an file-not-found response from the AUT 124, the observer 126 may add the following header to the application response:

X-WIPP-FNF: 404

In this way, the file-not-found error can be reported to the scanner 128 regardless of the HTTP response provided by the AUT 124.

The per-request headers may also include a Request ID header. The Request ID header may be formatted as follows:

X-WIPP-RequestID:<request_id>

As described further below, under the section entitled "Service Requests." the scanner 128 may request additional information that was gathered by the observer 126 in response to an application request but not reported in the application response. The additional information may be included in a data structure referred to herein as a "trace." The information included in the trace describes the operations of the AUT 124 that were triggered by a specific application request. To support the trace request service, the observer 126 may add the Request ID header to each application response to enable the scanner 128 to associate the requested trace with the specific application response corresponding to the requested trace. In embodiments, the <request_id> field value is assigned by the scanner 128 and included in the application request. The observer 126 may then use the same request_id value in the Request ID header that is added to the corresponding application response. In embodiments, the scanner 128 does not add a request ID header to application requests, in which case the observer 126 may generate a unique value for the request_id and include the request_id in a Request ID header added to the application response. In either case, the same request_id value may be used by the scanner 128 to request the corresponding trace from the observer 126.

The per-request headers may also include an update header, used by the observer 126 to notify the scanner 128 of various types of changes regarding the AUT 124. The update header may be formatted as follows:

X-WIPP-Update: <service_name_list>

The <service_name_list> value may be a comma-separated list of service names, each of which refers to a services provided by the observer 126 that may provide new information as a result of a change in the AUT 124. When new information about the AUT 124 becomes available, the observer 126 may notify the scanner 128 by adding the update header to an application response. In this way, the update header informs the scanner 128 that new information about the AUT 124 is available and what service to request to obtain the information. For example, if the observer 126 detects additional URLs that have been generated during the security test of the AUT 124, the observer 126 may send an update header to the scanner 128 wherein <service_name_list> equals "AttackSurface." Upon receiving the update header, the scanner 128 may send a service request to the observer 126 requesting the identified service or services. The observer 126 may continue to send the update header in every application response until the scanner 128 issues a service request for the named service or services.

Service Requests—Traces

In response to an application request, the observer 126 may determine the effect of the application request by determining, for example, particular lines of code that have been executed by the AUT 124, files that have been accessed by the AUT 124, database queries executed by the AUT 124, or other information. The data collected by the observer 126 can be stored to a data structure, referred to herein as a "trace." In embodiments, each trace may be stored to the buffer 210. Each trace may include the Request ID of the application request and the application response that corresponds with the trace. The scanner 128 can learn about the internal operations of the AUT 124 that were triggered by a particular application request by retrieving the corresponding, trace from the observer 126. To retrieve a trace, the scanner 128 may issue a service request to the observer 126 that includes a header field name/value pair configured to indicate the request of the trace corresponding to a particular application request or response. For example, the field name/value pair for requesting a trace may be formatted as follows:

Trace=<request_id>

The value <request_id> is the value assigned by the scanner 128 or the observer 126 that corresponds with the application request and/or application response associated with the requested trace, as described above in relation to the section entitled "PER-REQUEST HEADERS." Upon receiving the trace service request, the observer 126 may bypass the AUT 124 and generate a service response that includes the requested trace. In embodiments, the requested trace may be retrieved by the observer 126 from the buffer 210 and added to the body of the service response, which may then be sent to the scanner 128. The service response header includes the request_id value of the requested trace, and the body of the service response may be formatted as a JSON object.

The observer 126 may maintain a plurality of traces in the buffer 210 so that the scanner 128 can request a trace for any application request that has been made. The buffer 210 may be of any size suitable for a particular implementation. In an embodiment, traces stored to the buffer 210 may be removed from the buffer 210 in a first-in-first-out manner if the buffer 210 becomes full. If the scanner 128 requests an unknown request ID, the observer 126 may return an error. A request ID may be unknown if it is invalid, was never used, or has aged-out of the buffer 210 of traces maintained by the observer 126.

The scanner 128 may be configured to send a separate trace service request after the corresponding application request was made and a response received from the AUT 124. The request_id enables the observer 126 to receive trace requests out-of-sequence while still being able to associate the received trace with the appropriate application request and response. Trace requests may be received out-of-sequence due, in part, because the scanner 128 might have multiple threads of execution issuing application requests to the AUT 124. The scanner 128 may also be configured to abort a timed-out application request, in which case the scanner 128 may retrieve an incomplete trace from the observer 126. To differentiate between complete and incomplete traces, the observer 126 may be configured to add a special node to each completed trace that indicates that the application request corresponding to this trace request was successfully completed. For example, the observer 126 may add a special node of type "request_complete" at the end of each completed trace. The absence of the "request_complete" node may indicate to the scanner 128 that the corresponding application request failed.

The observer 126 may monitor processes performed by the AUT 124 that occur outside the context of an application request, such as processes initiated by the additional monitor code injected by the observer 126. To avoid incurring an unacceptable level of performance overhead, the observer 126 may be configured to minimize the performance overhead of monitoring processes that are unrelated to application requests. For example, the performance overhead may be minimized by injecting the monitor code to selectively monitor specific API calls and relevant portions of the AUT's user code.

The trace returned to the scanner 128 may include one or more trace nodes of various types. Each trace node conveys some bit of information corresponding to the internal processes performed by the AUT 124. In embodiments, each trace node includes a type property, which may be any suitable string of characters that uniquely identifies the type of the trace node. Some trace node types may be based on the type of action that was performed by the AUT 124.

In embodiments, the observer 126 may record information about a call stack used by the AUT 124 and the container code. A call stack is a data structure that stores information about the active subroutines of a computer program. For example, the call stack may keep track of a line of code to which an active subroutine should return control when it finishes executing. The call stack may also be used to pass parameters to a subroutine, and allocate memory for variables local to the subroutine, among other functions. The call stack may include a top stack frame that represents a currently executing subroutine called by the AUT 124 or the AUT's container code. The top stack frame may include a file name and line number that identifies a particular line of code.

Each trace may include one or more trace nodes, wherein each trace node describes details regarding a particular call stack generated by the AUT 124. Trace nodes may include a location property that identifies a file name and line number of the top stack frame outside the observer 126 in the AUT 124 container code. Trace nodes may also include a "user_context" property giving a file name and line number for the top stack frame in the AUT 124 user code if such a stack frame can be identified. The context property enables the scanner 128 to create a vulnerability report that includes a root-cause analysis for vulnerabilities and enables the scanner 128 to group together vulnerabilities that are associated with the same location in the code.

In embodiments, the observer 126 is configured to detect vulnerabilities. For example, the scanner 128 may send an attack to the AUT 124 in the form of an application request configured to create of an arbitrary file on the file system 204. The application request may include custom header information that informs the observer 126 regarding the nature of the attack. If the AUT 124 is vulnerable, the observer 126 will encounter a file creation API call, thus informing the observer 126 that the File Upload attack was successful and a vulnerability has been detected.

If the observer 126 detects a vulnerability, the observer 126 may generate a trace node referred to herein as a "vulnerability trace node." A vulnerability trace node may include one or more stack traces which provide code location information to the scanner 128 such as sink program points and, when available, one or more potential source program points. A source program points is a code location where malicious input is consumed by the AUT 124, and a sink program point is a code location where the malicious input modifies the behavior of the AUT 124. For example, in the case of a Cross-Site Scripting vulnerability the source program point is where a user supplied value is read from a URL parameter, and the sink program point is where the tainted parameter value is written to an HTML page. Stack traces may be elided such that they do not include stack frames from the observer 126. The vulnerability trace node may include stack frames relating to both the AUT 124 code and the container code, and each stack frame may include an indication of whether the stack frame relates to user code or container code. Due to the code location information provided by the observer 126, the scanner 128 can create vulnerability reports that pinpoint the location of the vulnerability in the AUT 124, and can group vulnerabilities that occur at the same location in the AUT 124, thus reducing duplication in the vulnerability reports generated by the scanner 128. The code location information also provides the user insight into the nature of the vulnerability and therefore reduces the amount of remediation effort used to repair the problem.

The vulnerability trace node may also include a vulnerability category, such as "Cross-Site Scripting" or "SOL Injection," and standard vulnerability identifier such as a Common Weakness Enumeration (CWE) identifier corresponding to each vulnerability category. The vulnerability trace node may also include relevant details about the detection of the vulnerability. For example, if the vulnerability is an SQL injection vulnerability, the vulnerability trace node may include the SQL query involved in the detection of the vulnerability by the observer 126. In this way, the observer 126 is able to detect and report an SQL injection vulnerability to the scanner 128 even if the vulnerability does not manifest itself in the application response returned to the scanner 128.

The observer 126 may also generate a trace node referred to herein as a "database trace node" if the AUT 124 performs a query against a database, such as an SQL query. The database trace node may include the text of the database query and values for the bind parameters used by the AUT 124 in the database query. Other types of trace nodes may include begin nodes and end nodes for source code files invoked by the AUT 124 such as, JAVA servlets, JAVA Server Pages (JSPs), and the like. Begin nodes and end nodes refer to the nodes in the control flow structure representing the flow of execution through the AUT 124. Begin nodes and end nodes may include the file name of the source code file and parameters passed to the source code file. The observer 126 may also generate other types of trace nodes to represent, for example, reads and writes of the file system 204 performed by the AUT 124, Web service calls performed by the AUT 124, and network service operations performed by the AUT 124, among others.

As stated above, the scanner 128 may use trace information to group together duplicate vulnerabilities. The grouping of duplicate vulnerabilities may be performed by a de-duplication process implemented buy the scanner 128. In de-duplication, the scanner 128 may apply a hashing algorithm to portions of a vulnerability trace node, such as the user_context property and vulnerability category, in order to create an identifier for the vulnerability. Two vulnerabilities that have the same identifier can be considered duplicates from the perspective of the AUT 124. The vulnerability identifier may be used to notify the user that fixing one of these vulnerabilities will likely remedy other vulnerabilities with the same vulnerability identifier. The scanners user interface may be configured to present duplicate vulnerabilities to the user in a group.

In embodiments, the scanner 128 is configured to optimize the attacks it sends to the AUT 124 based on the trace information. For example, if a trace shows that a particular application request does not access the file system 204, the scanner can be configured to omit similar attacks related to that application request that are directed at vulnerabilities related to the file system 204. Similarly, if a trace shows that a particular application request does not invoke a database query, the scanner can be configured to omit similar attacks related to that application request that are directed at vulnerabilities in the database, such as SQL injection.

In embodiments, database query information from database trace nodes may be used to identify more persistent cross-site scripting vulnerabilities. For example, application requests targeting the database 206 may be associated with the database tables and columns that are accessed by the AUT 124 due to the application request. The scanner 128 can use this information to send an attack that attempts to store data in the database 206 with an application request that writes the data to a particular location in the database 206. The scanner 128 may determine the effect of the attack by sending an application request that reads from the same location in the database 206.

Service Requests—Server Information

The observer 126 may be configured to provide a service, referred to herein as a "server information service," used to inform the scanner 128 about the server 120. To retrieve server information, the scanner 128 may issue a server information service request to the observer 126 that includes a header field name, such as "Server", which is configured to indicate the request of server information. Upon receiving a server information service request, the observer 126 may bypass the AUT 124 and return the requested server information to the scanner 128.

The requested server information may be returned in the body of a service response generated by the observer 126 and formatted, for example, as a JSON object. Examples of server information included in the service response may include the name and version of the host operating system, the name and version of the application server, the amount of time that the application server has been running without any downtime, number of threads currently being processed, and the amount of memory currently in use, among other information. The scanner 128 may use the server information to generate attacks that are appropriate for the server 120 hosting the AUT 124. For example, the scanner 128 may be configured to avoid sending Microsoft® Windows-based attacks to the AUT 124 if the server 120 hosting the AUT 124 is running Linux.

Service Requests—Application Information

The observer 126 may be configured to provide a service, referred to herein as an "application information service," that is used to inform the scanner 128 about the AUT 124. To retrieve application information, the scanner 128 may issue an application information service request to the observer 126 that includes a field name, such as "Application", which is configured to indicate the request of application information. Upon receiving the application information service request, the observer 126 may bypass the AUT 124 and return the requested application information to the scanner 128.

The requested application information may be returned in the body of a service response generated by the observer 126 and formatted, for example, as a JSON object. If there is no application information available to be sent, the body of the service response may be empty. Examples of application information returned by the service response may include the name and version of all of the databases that the AUT 124 interacts with, file libraries used by the AUT 124, Web services subsystems, and other subsystems and software frameworks that the AUT 124 interacts with, among other information. The scanner 128 can use the application information to generate attacks more efficiently. For example, information about the databases being used by the AUT 124 may enable the scanner 128 to generate attacks that are appropriate for the identified databases and avoid generating attacks for databases that are not in use. Additionally, the scanner 128 can avoid sending attacks that target a Microsoft® SQL Server to an AUT 124 that uses only an Oracle database.

Service Requests—Attack Surface

The observer 126 may be configured to provide a service, referred to herein as an "attack surface service," used to identify components of the attack surface that might not be detected by simple Web crawler. To retrieve attack surface information, the scanner 128 may issue an attack surface service request that includes a header field name, such as "AttackSurface", which is configured to indicate the request of attack surface information. Upon receiving the application information service request, the observer 126 may bypass the AUT 124 and return the requested attack surface information to the scanner 128. The attack surface information may be returned in the body of a service response generated by the observer 126 and formatted, for example, as a JSON object. If there is no attack surface information available to be sent, the body of the service response may be empty.

The attack surface of the AUT 124 includes the resources that are accessible to the scanner 128, such as Web page links, for example. The scanner 128 or the observer 126 may be configured to analyze, or "crawl," the AUT 124 to discover such Web page links. Some resources that are accessible to the scanner 128 may not be associated with a Web page link and are, in this sense, hidden resources that are not discoverable by crawling the AUT 124. Hidden resources may exist as files in the file system 204 and may be discovered by the observer 126, which has access to the file system 204. Additionally, some resources may be generated by the AUT 124 dynamically at runtime, in other words, during execution of the AUT 124 in response to a received application request. Dynamic resources may be generated during runtime based on configuration files and mapping files, such as Web.xml files, which are files that map a requested URL to a resource on the file system 204 based on pre-defined rules. Dynamically generated resources may be discovered by the observer 126 by examining mapping and configuration files and by observing the execution of the AUT 124 to identify Uniform Resource Locators (URLs) that are bound dynamically at runtime.

Each resource accessible to the scanner 128 may be referred to as an attack surface component. Each attack surface component discovered by the observer 126 may be formatted as a URL and reported to the scanner 128 in the body of the attack surface service response. Each attack surface component may also be tagged within the body of the attack surface service response to identify the attack surface component as static or dynamic. Resources discovered by exploring the file system 204, including files located in the root directory of the file system 204 and below, may be tagged as static. Resources discovered by examining mapping and configuration files may be tagged as dynamic. In the case of containers such as WebLogic that do not expand a Web application ARchive (WAR) file as part of running the application, the observer 126 may let the container code handle the task of extracting the resources from the WAR files and then use the list of extracted resources to define the attack surface.

Error Handling

In some cases, the scanner 128 may issue a service request that cannot be fulfilled by the observer 126. For example, the scanner 128 may issue a service request that is not recognized by the observer 126 or a service request with a header field value that is not recognized by the observer 126, such as a trace request with an unknown request ID. If the observer 126 encounters a service requests that cannot be fulfilled, the observer 126 may return an error to the scanner 128 in the header of a service response or application response. For example, the observer 126 may issue a service response formatted as follows:

X-WIPP-Error: <error_text_string>

The header field value <error_text_string> may be any suitable text string that gives a brief description of the error encountered. The text string describing the error may be stored by the scanner 128 to an error log that is viewable by the user. Furthermore, the observer 126 may maintain an error log, wherein each error log entry includes a more detailed description of the problem. The error log maintained by the observer 126 may records any errors encountered during the operation of observer 126, Errors may be generated by the observer 126 in response to service requests or the portion of an application request header that includes information intended to target the observer 126. If the error is generated in response to a service request, the error message may be returned in a service response, and the body of the service response may be empty. If the error is generated in response to information included in an application request, the error message may be returned in an application response, and the body of the application response may contain whatever data the AUT 124 provides in accordance with its programming.

Figure 3:
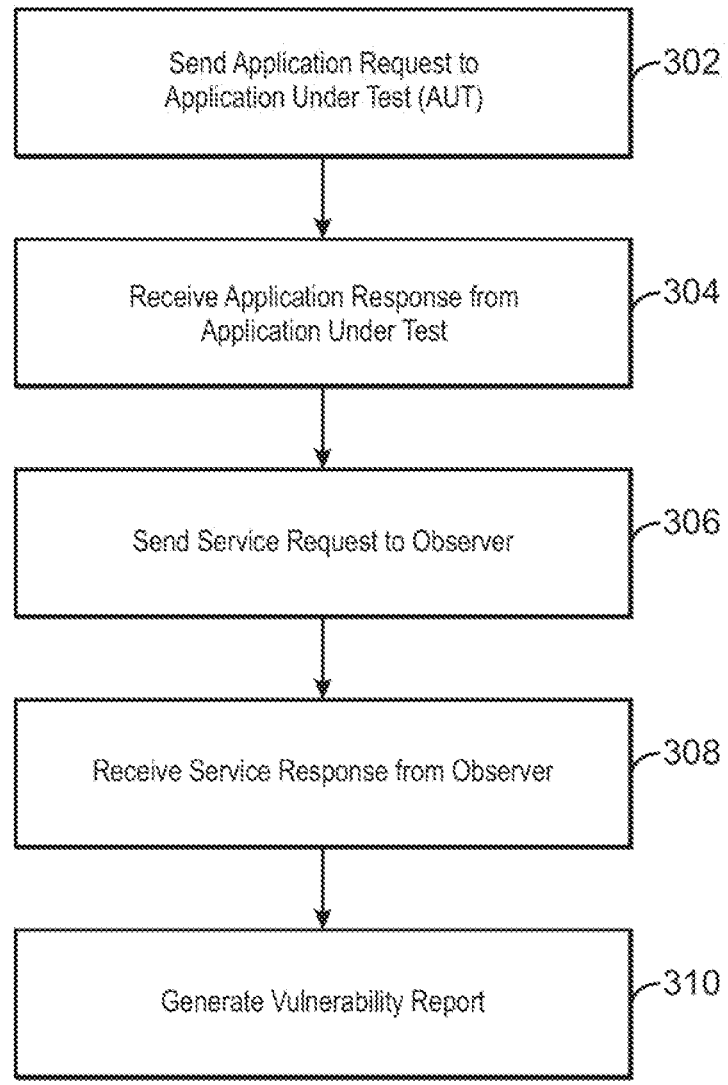
FIG. 3 is a process flow diagram of a method of performing gray-box security testing, in accordance with embodiments.

FIG. 3 is a process flow diagram summarizing a method of performing gray-box security testing, in accordance with embodiments. The method 300 may be performed by the scanner 128 in communication with the AUT 124 and the 126, as described in reference to FIG. 2. The method 300 may begin at block 302, wherein an application request may be sent to AUT 124. The application request may be configured to expose a potential vulnerability of the AUT 124. As discussed above, the application request may include custom headers used to communicate information to the observer 126. For example, the scanner 128 may add a request ID value to a header of the application request that uniquely identifies the application request to the observer 126.

At block 304, the scanner 128 may receive an application response from the AUT 124 in accordance with the AUT's programming. If the scanner 128 is configured to add request IDs to each application request, the observer 126 may add the same request ID to the header of the application response. Otherwise, the scanner 128 may generate a unique request ID and add the request. ID to the header of the application response. As described above, the observer 126 may also add additional information to the header of the application response, such as a the-not-found header, an observer version header, an update header, and the like.

At block 306, the scanner 128 may send a service request to the observer 126. In embodiments, the service request may be included in the application request of block 302 by adding additional header information to the application request. In embodiments, the service request may be a separate request, in other words, not combined with an application request. Service requests are processed by the observer 126 and not passed to the AUT 124. Service requests may be configured to request information such as attack surface information, server or application information, and trace information that relates to the internal processes of the AUT 124, among others. The scanner 128 may add the request ID to the header of the service request to obtain trace information corresponding to a particular application response.

At block 308, the scanner 128 may receive a service response from the observer 126. The service response may include information about the processes performed by the AUT 124 due to the application request. For example, the service response may include stack trace information identifying processes performed by the AUT 124 as a result of the application request. The service response may include vulnerability trace nodes that contain code locations corresponding to a vulnerability detected by the observer 126. The service response may also include information corresponding to a database query performed by the AUT 124 as a result of the application request. In embodiments, the service response may include information about the AUT 124 such as the programming language of the AUT 124, the name and version of the AUT 124, and the attack surface of the AUT 124 including static and dynamic URLs, among other information. The service response may also include information about the observer 126, such as the operating system name and version, application server name and version, number of threads, memory usage, and amount that the server 120 has been running without any downtime, among other information.

It will be appreciated that method 300 is merely an example process flow used to explain embodiments of the present techniques, and that the actual process flow may vary depending on a particular implementation. For example, the scanner 128 may not issue a service request for every application request. Additionally, the scanner 128 may send and receive multiple application requests and responses before sending a service request related to a particular one of the application responses.

At block 310, the scanner 128 may generate a vulnerability report based on the information received from the AUT 124 and the observer 126. The vulnerability report may group detected vulnerabilities based on the code location information included in the trace nodes received at block 308. The vulnerability report may be presented to the user through a user interface provided by the scanner 128. The vulnerability report may also be stored to memory, printed, and the like.

Figure 4:
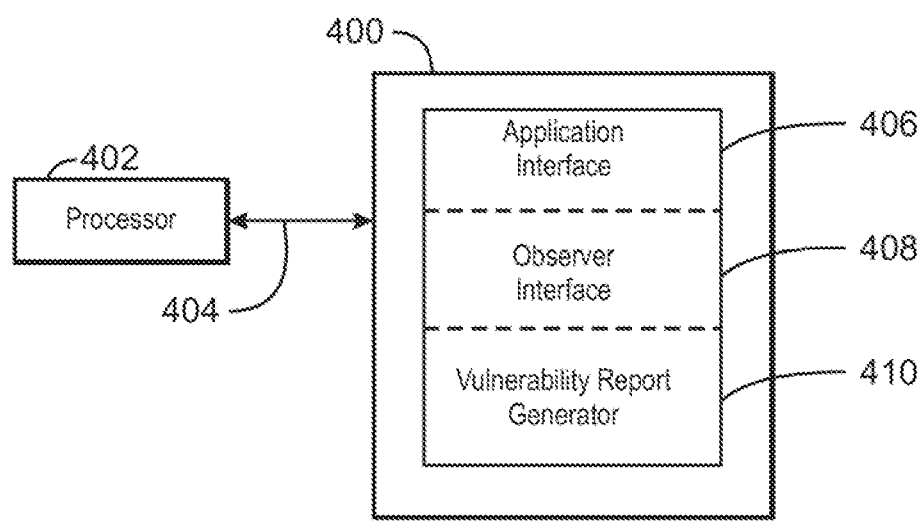
FIG. 4 is a block diagram showing a non-transitory, computer-readable medium that stores code configured to conduct gray-box security testing, in accordance embodiments.

FIG. 4 is a block diagram showing a non-transitory, computer-readable medium that stores code configured to conduct gray-box security testing, in accordance with embodiments. The non-transitory, machine-readable medium is referred to by the reference number 400. The non-transitory, machine-readable medium 400 can include RAM, a hard disk drive, an array of hard disk drives, an optical drive, an array of optical drives, a non-volatile memory, a universal serial bus (USB) drive, a digital versatile disk (DVD), a compact disk (CD), and the like. The non-transitory, machine-readable medium 900 may be accessed by a processor 902 over a communication path 904.

As shown in FIG. 4, the various components discussed herein can be stored on the non-transitory, machine-readable medium 400. A region 406 on the non-transitory, machine-readable medium 400 can include an application interface configured to send application requests to the AUT 124, wherein the application requests are configured to expose a potential vulnerability of the AUT 124. The application interface can also receive application responses from the AUT 124, wherein the application responses are generated by the AUT 124 in accordance with the AUT's programming. A region 408 can include, an observer interface configured to send service requests to the observer 126. The observer interface also receives the service responses, which contain information corresponding to processes performed by the AUT 124 due to the application request, information about the AUT 124, or information about the server 120 hosting the AUT 124, for example. A region 410 can include a vulnerability report generator configured to analyze the data received from the AUT 124 and the observer 126 and generate a vulnerability report based in the analysis.

What is claimed is:

1. A system, comprising:
 a server hosting an application under test (AUT);
 an observer configured to i) monitor instructions executed by the AUT, ii) generate a trace identifying instructions executed by the AUT as a result of an application request, and iii) send the trace to a requesting computing device in a body of a service response; and
 a computing device communicatively coupled to the AUT and the observer through a common communication channel, the computing device comprising a processor and a memory device for storing computer-readable instructions configured to direct the processor to:
 send the application request to the AUT, wherein the application request is configured to expose a potential vulnerability of the AUT;
 receive an application response from the AUT in accordance with the AUT's programming;
 send a service request to the observer; and
 receive the service response from the observer, the service response containing information corresponding to the instructions executed by the AUT due to the application request, information about the AUT, or information about a server hosting the AUT.

2. The system of claim 1, wherein the observer is configured to communicate with the computing device, at least in part, by adding a custom header to the application response.

3. The system of claim 1, the memory device comprising computer-readable instructions configured to direct the processor to receive trace information from the observer, the trace information comprising a plurality of vulnerability trace nodes, each vulnerability trace node containing code locations corresponding to a vulnerability detected by the observer.

4. The system of claim 3, the memory device comprising computer-readable instructions configured to direct the processor to group the plurality of vulnerability trace nodes based on the vulnerability trace nodes containing the same code locations.

5. The system of claim 1, wherein the observer is configured to monitor the AUT to identify new uniform resource locators (URLs) that are generated dynamically during runtime of the ALT, and return an update field in a header of the application response, the update field configured to inform the computing device that an attack surface of the AUT has changed.

6. The system of claim 1, wherein the observer is configured to:
 receive a request from the computing device and analyze a header of the request;
 identify the request as the application request or the service request based on the analysis of the header;
 pass the application request to the AUT; and
 process the service request without passing the service request to the AUT.

7. A method, comprising:
 sending an application request to an application under test (AUT), wherein the application request is configured to expose a potential vulnerability of the AUT;

receiving an application response from the AUT in accordance with the AUT's programming;

sending a service request to an observer that i) monitors instructions executed by the AUT, ii) generates a trace identifying instructions executed by the AUT as a result of the application request, and iii) sends the trace in a body of a service response; and receiving the service response from the observer, the service response containing information corresponding to instructions executed by the AUT due to the application request, information about the AUT, or information about a server hosting the AUT;

wherein the application request, application response, service request, and service response are communicated over a same network channel.

8. The method of claim 7, comprising receiving a file-not-found header in the application response, the file-not-found header added to the application response by the observer to indicate a file-not-found error generated by the AUT.

9. The method of claim 7, wherein the service request is a trace service request, the method comprising receiving a stack trace in a body of the service response received from the observer.

10. The method of claim 7, comprising receiving a vulnerability trace node in the body of the service response, wherein the vulnerability trace node identifies a vulnerability detected by the observer.

11. The method of claim 7, wherein the service request is an attack surface service request, the method comprising receiving information about the attack surface of the AUT in a body of the service response, the attack surface comprising static URLs and dynamic URLs that are generated by the AUT during runtime.

12. The method of claim 7, further comprising:
communicating, by the observer, by adding a custom header to the application response.

13. The method of claim 7, further comprising:
receiving, by the observer, a request and analyzes a header of the request;
identifying, by the observer, the request as the application request or the service request based on the analysis of the header;
passing, by the observer, the application request to the AUT; and
processing, by the observer, the service request without passing the service request to the AUT.

14. The method of claim 7, wherein the trace includes trace information comprising a plurality of vulnerability trace nodes, each vulnerability trace node containing code locations corresponding to a vulnerability detected by the observer.

15. A non-transitory, compute le medium, comprising code configured to direct a processor to:
send an application request to an application under test (AUT), wherein the application request is configured to expose a potential vulnerability of the AUT;
receive an application response from the AUT in accordance with the ALT's programming;
send a service request to an observer that i) monitors instructions executed by the AUT, ii) generates a trace identifying instructions executed by the AUT as a result of the application request, and iii) sends the trace in a body of a service response; and
receive the service response from the observer, the service response containing information corresponding to instructions executed by the AUT due to the application request, information about the AUT, or information about a server hosting the AUT;
wherein the application request, application response, service request, and service response are communicated over a same network channel.

16. The non-transitory, computer readable medium of claim 15, comprising code configured to direct the processor to add a request ID to a header of the application request that uniquely identifies the application request, wherein the service response received from the observer includes the request ID.

17. The non-transitory, computer readable medium of claim 15, wherein the service response includes a database trace node that includes information corresponding to a database query performed by the AUT as a result of the application request.

18. The non-transitory, computer readable medium of claim 15, wherein the observer communicates, at least in part, by adding a custom header to the application response.

19. The non-transitory, computer readable medium of claim 15, wherein the observer:
receives a request and analyzes a header of the request;
identifies the request as the application request or the service request based on the analysis of the header;
passes the application request to the AUT; and
processes the service request without passing the service request to the AUT.

20. The non-transitory, computer readable medium of claim 15, wherein:
the service request is an attack surface service request, and information about the attack surface of the AUT is included in the body of the service response, and the attack surface comprises static URLs and dynamic URLs that are generated by the AUT during runtime.

* * * * *

UNITED STATES PATENT AND TRADEMARK OFFICE
CERTIFICATE OF CORRECTION

PATENT NO. : 9,215,247 B2
APPLICATION NO. : 14/116000
DATED : December 15, 2015
INVENTOR(S) : Chess et al.

Page 1 of 2

It is certified that error appears in the above-identified patent and that said Letters Patent is hereby corrected as shown below:

IN THE SPECIFICATION

Column 1, line 42, delete "embodiments:" and insert -- embodiments; --, therefor.

Column 4, line 19, delete "used, to" and insert -- used to --, therefor.

Column 4, line 66, delete "specific," and insert -- specific --, therefor.

Column 5, line 2, delete "AUTs" and insert -- AUT's --, therefor.

Column 6, line 16, delete "example. If" and insert -- example, if --, therefor.

Column 6, line 27, delete "Requests." and insert -- Requests, --, therefor.

Column 7, line 19, delete "corresponding," and insert -- corresponding --, therefor.

Column 9, line 23, delete ""SOL" and insert -- "SQL --, therefor.

Column 9, line 65, delete "scanners" and insert -- scanner's --, therefor.

Column 12, line 21, delete "126," and insert -- 126. --, therefor.

Column 12, line 52, delete "request. ID" and insert -- request ID --, therefor.

Column 12, line 55, delete "the-not-found," and insert -- file-not-found --, therefor.

Column 13, line 54, delete "904," and insert -- 904. --, therefor.

Column 13, line 65, delete "include," and insert -- include --, therefor.

Signed and Sealed this
Fifth Day of July, 2016

Michelle K. Lee
*Director of the United States Patent and Trademark Office*

CERTIFICATE OF CORRECTION (continued)
U.S. Pat. No. 9,215,247 B2

IN THE CLAIMS

Column 14, line 51, Claim 5, delete "ALT" and insert -- AUT --, therefor.

Column 15, line 23, Claim 9, delete "observer," and insert -- observer. --, therefor.

Column 16, line 1, Claim 15, delete "compute le medium" and insert -- computer readable medium --, therefor.

Column 16, line 7, Claim 15, delete "ALT's" and insert -- AUT's --, therefor.